(12) United States Patent
Stall et al.

(10) Patent No.: US 8,381,195 B2
(45) Date of Patent: Feb. 19, 2013

(54) IMPLEMENTING PARALLEL LOOPS WITH SERIAL SEMANTICS

(75) Inventors: Jonathon Michael Stall, Bothell, WA (US); Curt Oliver Hagenlocher, Mercer Island, WA (US); John Benjamin Messerly, Seattle, WA (US); James J. Hugunin, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 400 days.

(21) Appl. No.: 12/817,466

(22) Filed: Jun. 17, 2010

(65) Prior Publication Data

US 2011/0314461 A1    Dec. 22, 2011

(51) Int. Cl.
G06F 9/44 (2006.01)
(52) U.S. Cl. ........................................ 717/131
(58) Field of Classification Search ............... 717/150, 717/160, 131, 146, 119; 712/205, 241; 718/106; 716/104

See application file for complete search history.

(56) References Cited

U.S. PATENT DOCUMENTS

| | | | | |
|---|---|---|---|---|
| 5,404,473 A | * | 4/1995 | Papworth et al. | 712/241 |
| 5,437,034 A | * | 7/1995 | Tanaka et al. | 717/160 |
| 6,282,704 B1 | | 8/2001 | Iitsuka | |
| 6,732,354 B2 | * | 5/2004 | Ebeling et al. | 717/119 |
| 7,076,776 B2 | | 7/2006 | Kim | |
| 7,089,545 B2 | | 8/2006 | Bera | |
| 7,171,544 B2 | | 1/2007 | Bera | |
| 7,840,931 B2 | * | 11/2010 | Gutberlet et al. | 716/104 |
| 2008/0120299 A1 | | 5/2008 | Duffy | |

OTHER PUBLICATIONS

Darte, Alain, et al., "Combining retiming and scheduling techniques for loop parallelization and loop tiling", Nov. 1996, 13 pages.
Inside HPC, "Serial Semanitics with Cilk++", Dec. 16, 2008, 2 pages.
Van Der Pas, Ruud, Ruud's Weblog, "Demystifying Persistent OpenMP Myths—Part 1", Feb. 2009, 5 pages.
Quinlan, Dan, et al., "Semantic-Driven Parallelization of Loops Operating on user-Defined Containers", 2004, 15 pages.

* cited by examiner

*Primary Examiner* — Tuan A Vu
(74) *Attorney, Agent, or Firm* — Workman Nydegger (57) ABSTRACT

The present invention extends to methods, systems, and computer program products for implementing parallel loops with serial semantics. Embodiments of the invention provide a semantic transforms and codegen patterns that provide more efficient parallel loop implementations with serial loop semantics. Embodiments of the invention support assignments within for-loop bodies, support break/return constructs within for-loop bodies, and run transformations to covert serial constructs to parallel constructs.

19 Claims, 5 Drawing Sheets

401
Determining That A Specified Number Of Loop Iterations Of A Loop Are To Be Executed, Each Iteration In The Specified Number Of Loop Iterations Assigning A Value To At Least One Variable, One Or More Loop Iterations In The Specified Number Of Loop Iterations Causing The Loop To Break Execution

402
Concurrently Executing One Or More Different Pluralities Of Loop Iterations From Among The Specified Number Of Loop Iterations, Including To Determine For Each Loop Iteration:

403
Determining What Values Are Assigned To The At Least One Variable

404
Determining If The Loop Iteration Causes The Loop To Break Execution

405
Detecting That A Loop Iteration Prior To The Specified Number Of Loop Iterations Caused The Loop To Break Execution To 406

IMPLEMENTING PARALLEL LOOPS WITH SERIAL SEMANTICS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Many computing tasks are performed in parallel to increase performance. For example, when a computer has multiple processors and/or processor cores, different portions of a program can be executed on different processors/processor cores simultaneously, reducing overall execution time. However, many parallel processing implementations have non-intuitive semantics. These parallel semantics are often significantly more complex than simpler serial semantics. For example, a common mechanism for parallel semantics is to hoist the body of a loop into its own function and execute each loop iteration out of order. Unfortunately, this leads to non-deterministic behavior, particularly around side-effecting operations.

Consider the following code portion, which has a side-effecting operation to write to a variable used outside a loop:

```
t = 5
for i in N
    if f(i) {
        t = 10
    }
    if g(i) {
        t = 20
    }
End
Read(t)
```

Within the code portion t is used outside the loop. Further, t is not necessarily assigned in every or even any iteration of the loop body. Also, the iterations when t is assigned are determined at runtime and not statically. Each iteration may also have multiple assign points to different values. One or more of these properties can lead to non-deterministic behavior when the loop iterations are executed in parallel.

BRIEF SUMMARY

The present invention extends to methods, systems, and computer program products for implementing parallel loops with serial semantics. Embodiments of the invention include methods for implementing iterations of a serial loop in parallel. In some embodiments, it is determined that a specified number of loop iterations (e.g., N) of a loop are to be executed. One or more iterations in the specified number of loop iterations assign one of a plurality of values to a variable used in the serial loop.

Each loop iteration is provided a temporary copy of the variable. One or more different pluralities of loop iterations, from among the specified number of loop iterations, are executed concurrently. From each of the one or more pluralities of loop iterations, it is determined if a value and what value is assigned to the variable for each different loop iteration in the plurality of loop iterations.

For at least one loop iteration, one of the plurality of values is assigned to the temporary copy of the variable provided for the loop iteration. It is indicated that the temporary copy of the variable provided for the loop iteration was assigned a value. Temporary copies of the variable provided for the loop iterations are ordered based on when each loop iteration would have been executed serially during serial execution of the loop.

The temporary copies of the variable are merged according to a reduction operator to identify the loop iteration closest to the last loop iteration (based on the specified number of loop iterations) that assigned a value to its temporary copy of the variable. The value assigned to the temporary variable for the loop iteration closest to the last loop iteration is assigned as the value for the variable.

In other embodiments, it is determined that a specified number of loop iterations of a loop are to be executed. Each iteration in the specified number of loop iterations may assign a value to at least one variable. One or more loop iterations, in the specified number of loop iterations, cause the loop to break execution. One or more different pluralities of loop iterations from among the specified number of loop iterations are executed concurrently.

For each loop iteration, it is determined what values are assigned to the at least one variable. For each loop iteration, it is determined if the loop iteration causes the loop to break execution. It is detected that a loop iteration prior to the specified number of loop iterations caused the loop to break execution.

In response to the break in loop execution, any assigned values for loop iterations that would otherwise occur after the loop iteration that caused the loop to break execution during serial execution are ignored. In response to the break in loop execution, further concurrent execution of loop iterations is also adjusted.

The adjustments include executing loop iterations that would otherwise occur before the loop iteration that caused the loop to break execution during serial execution. The adjustments also include ignoring any remaining loop iterations that would otherwise occur after the loop iteration that caused the loop to break execution during serial execution. Assigned values for loop iterations that would otherwise be assigned before the loop iteration that caused the loop to break execution during serial execution are committed.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for implementing parallel loops with serial semantics. Embodiments of the invention include methods for implementing iterations of a serial loop in parallel. In some embodiments, it is determined that a specified number of loop iterations (e.g., N) of a loop are to be executed. One or more iterations in the specified number of loop iterations assign one of a plurality of values to a variable used in the serial loop.

Each loop iteration is provided a temporary copy of the variable. One or more different pluralities of loop iterations, from among the specified number of loop iterations, are executed concurrently. From each of the one or more pluralities of loop iterations, it is determined if a value and what value is assigned to the variable for each different loop iteration in the plurality of loop iterations.

For at least one loop iteration, one of the plurality of values is assigned to the temporary copy of the variable provided for the loop iteration. It is indicated that the temporary copy of the variable provided for the loop iteration was assigned a value. Temporary copies of the variable provided for the loop iterations are ordered based on when each loop iteration would have been executed serially during serial execution of the loop.

The temporary copies of the variable are merged according to a reduction operator to identify the loop iteration closest to the last loop iteration (based on the specified number of loop iterations) that assigned a value to its temporary copy of the variable. The value assigned to the temporary variable for the loop iteration closest to the last loop iteration is assigned as the value for the variable.

In other embodiments, it is determined that a specified number of loop iterations of a loop are to be executed. Each iteration in the specified number of loop iterations may assign a value to at least one variable. One or more loop iterations, in the specified number of loop iterations, cause the loop to break execution. One or more different pluralities of loop iterations from among the specified number of loop iterations are executed concurrently.

For each loop iteration, it is determined what values are assigned to the at least one variable. For each loop iteration, it is determined if the loop iteration causes the loop to break execution. It is detected that a loop iteration prior to the specified number of loop iterations caused the loop to break execution.

In response to the break in loop execution, any assigned values for loop iterations that would otherwise occur after the loop iteration that caused the loop to break execution during serial execution are ignored. In response to the break in loop execution, further concurrent execution of loop iterations is also adjusted.

The adjustments include executing loop iterations that would otherwise occur before the loop iteration that caused the loop to break execution during serial execution. The adjustments also include ignoring any remaining loop iterations that would otherwise occur after the loop iteration that caused the loop to break execution during serial execution. Assigned values for loop iterations that would otherwise be assigned before the loop iteration that caused the loop to break execution during serial execution are committed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention provide a semantic transforms and codegen patterns that provide more efficient parallel loop implementations with serial loop semantics. Embodiments of the invention support assignments within for-loop bodies, support break/return constructs within for-loop bodies, and run transformations to covert serial constructs to parallel constructs.

Figure 1:
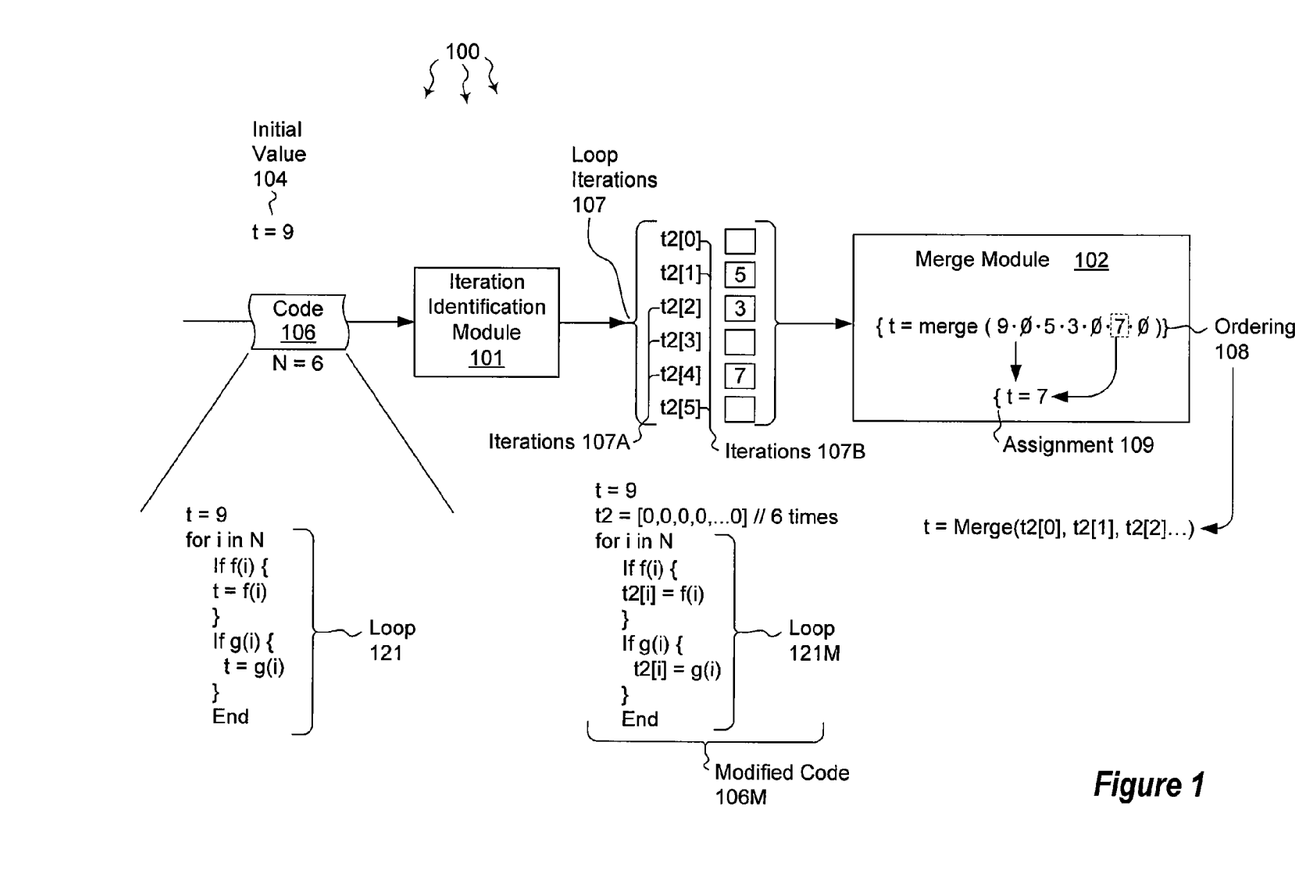
FIG. 1 illustrates an example computer architecture that facilitates implementing parallel loops with serial semantics.

FIG. 1 illustrates an example computer architecture 100 that facilitates implementing parallel loops with serial semantics. Referring to FIG. 1, computer architecture 100 includes iteration identification module 101, merge module 102, and code 106. Each of the depicted components is connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, iteration identification module 101 is configured to identify the number of iterations of a loop prior to execution of the loop. Iteration module 101 can also allocate a temporary private copy of a loop variable for use with each loop iteration. Merge module 102 is configured to utilize a reduction operation, such as, for example, merge, to reduce a plurality of values (e.g., values for a plurality of temporary private copies of a loop variable) to a single value. The single value represents the value of a variable within a loop when the loop completes.

Figure 2:
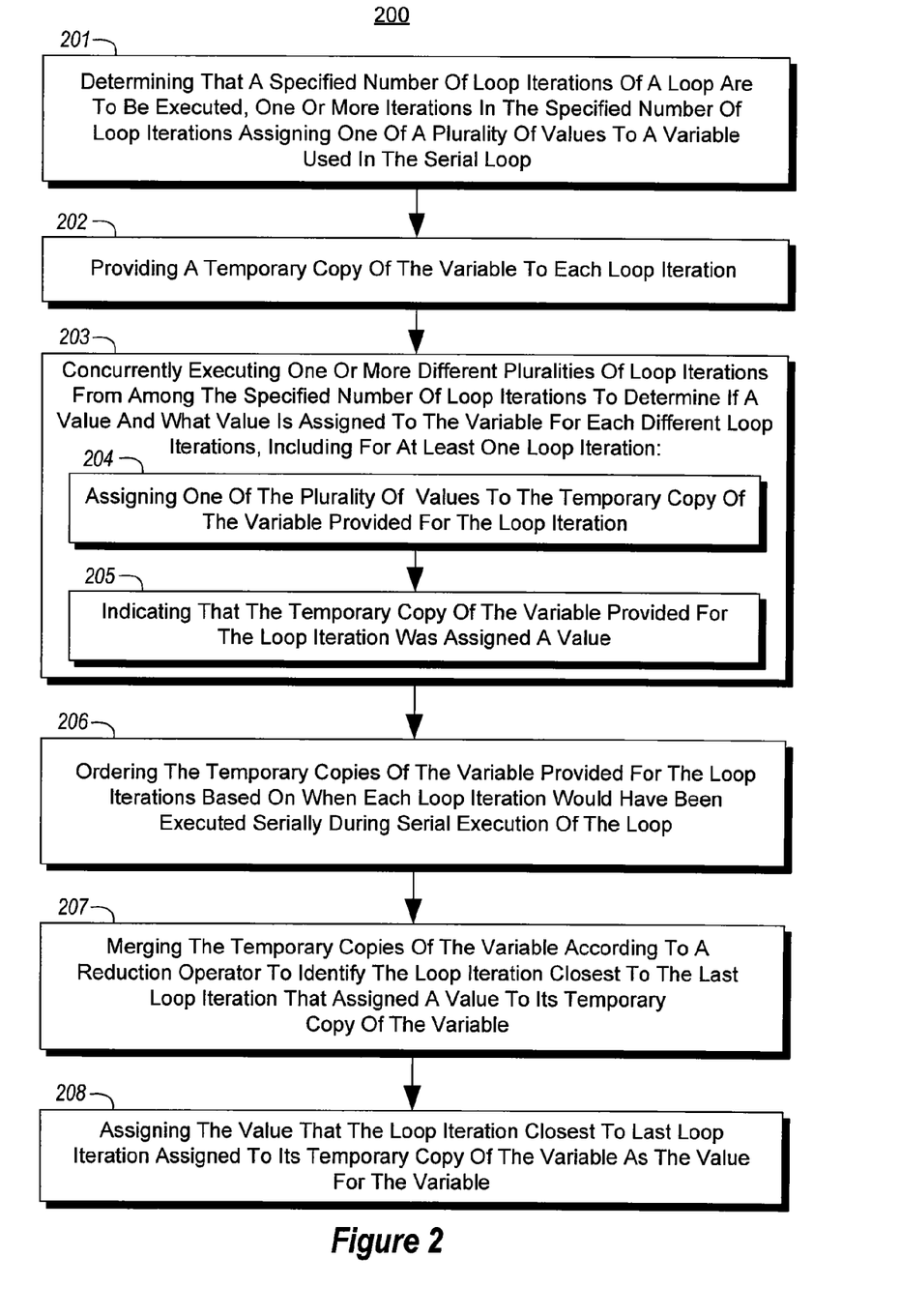
FIG. 2 illustrates a flow chart of an example method for implementing iterations of a serial loop in parallel.

FIG. 2 illustrates a flow chart of an example method 200 for implementing iterations of a serial loop in parallel. Method 200 will be described with respect to the components and data in computer architecture 100.

Method 200 includes an act of determining that a specified number of loop iterations of a loop are to be executed, one or more iterations in the specified number of loop iterations assigning one of a plurality of values to a variable used in the serial loop (act 201). For example, iteration identification module 101 can determine that loop 121 is to be executed six times. Iteration module 101 can parse code 106 to determine that N=6 prior to execution of loop 121. One or more iterations of loop 121 can assign a numeric value (e.g., an integer) or a value in some other range of values to the variable t.

Method 200 includes an act of providing a temporary copy of the variable to each loop iteration (act 202). For example, iteration identification module as provide a temporary copy of variable t to each iteration of loop 121. In some embodiments, an array is created. The array is indexed by the loop counter such that each loop iteration sets a different value within the array. Iteration identification module 101 can re-write code to implement an array for storing temporary copies of a variable. For example, iteration identification module 101 can re-write code 106 into modified code 106M.

Method 200 includes an act of concurrently executing one or more different pluralities of loop iterations from among the specified number of loop iterations to determine if a value and what value is assigned to the variable for each different loop iterations (act 203). For example, different pluralities of loop iterations 107 can be executed concurrently to determine if a value and what value are assigned to "t" for iteration of loop 107. For example in loop 121, if f(i) and g(i) are both FALSE for a specified iteration, t is not assigned as value. An extra codegen, such as, for example, maintaining an extra flag bit (e.g., similar to C#s Nullable) or using sentinel 'uninitialized' values in a variable's encoding (e.g., certain bit patterns in an IEEE double) can be used to indicate when a value is not assigned.

For at least one loop iteration, method 200 includes an act of assigning one of the plurality of values to the temporary copy of the variable provided for the loop iteration (act 204). For example, iterations 107A can be executed concurrently to assign t2[2]=3 and t2[4]=7. Prior to or subsequently, iterations 107B can be executed concurrently to assign t2[1]=5.

Method 200 includes an act of indicating that the temporary copy of the variable provided for the loop iteration was assigned a value (act 205). For example, it can be determined that t2[1], t2[2], and t2[4] were assigned values and that t2[0], t2[3], and t2[3] were not assigned values. Determining whether a value has been assigned in the loop body can be facilitated by referring to an extra codegen, or sentinel 'uninitialized' value in a variable's encoding. Accordingly, a function, such as, for example, boolHasValue( ) can be used to determine if a variable has been assigned a value.

Method 200 includes an act of ordering the temporary copies of the variable provided for the loop iterations based on when each loop iteration would have been executed serially during serial execution of the loop (act 206). For example, values for temporary copies oft for loop iterations 107 (as stored in array t2) can be ordered according to ordering 108. That is, the value of t2[0], followed by the value of t2[1], followed by the value of t2[2], etc.

Method 200 includes an act of merging the temporary copies of the variable according to a reduction operator to identify the loop iteration closest to the last loop iteration (based the specified number) that assigned a value to its temporary copy of the variable (act 207). For example, merge module 102 can merge values in ordering 108 to identify that the iteration corresponding to t2[4] (i.e., the fifth iteration) was the iteration of loop 121 closest to the sixth iteration (for N=6) that assigned a (e.g., non NULL) value, 7, to t2. The merge operation essentially determines the last loop iteration that would have assigned a value to the variable during serial execution of the loop.

In some embodiments, the following merge function is utilized, where the current value is compared to the next value in an ordered list:

```
Merge(ref t, newValue) {
    if (HasValue(newValue))
        t = newValue;
}
```

The merge function is an associative operator. As such, changing the order in which values in ordering 108 are merged does not change the value assigned at assignment 109.

Method 200 includes an act of assigning the value that the loop iteration closest to the last loop iteration assigned to its temporary copy of the variable as the value for the variable (act 208). For example, merge module 102 can assign 7 to t. Thus, even though different iterations of loop 121 were executed concurrently and potentially out of order, t is assigned the value that it would otherwise be assigned if iterations 107 were executed serially.

Figure 3:
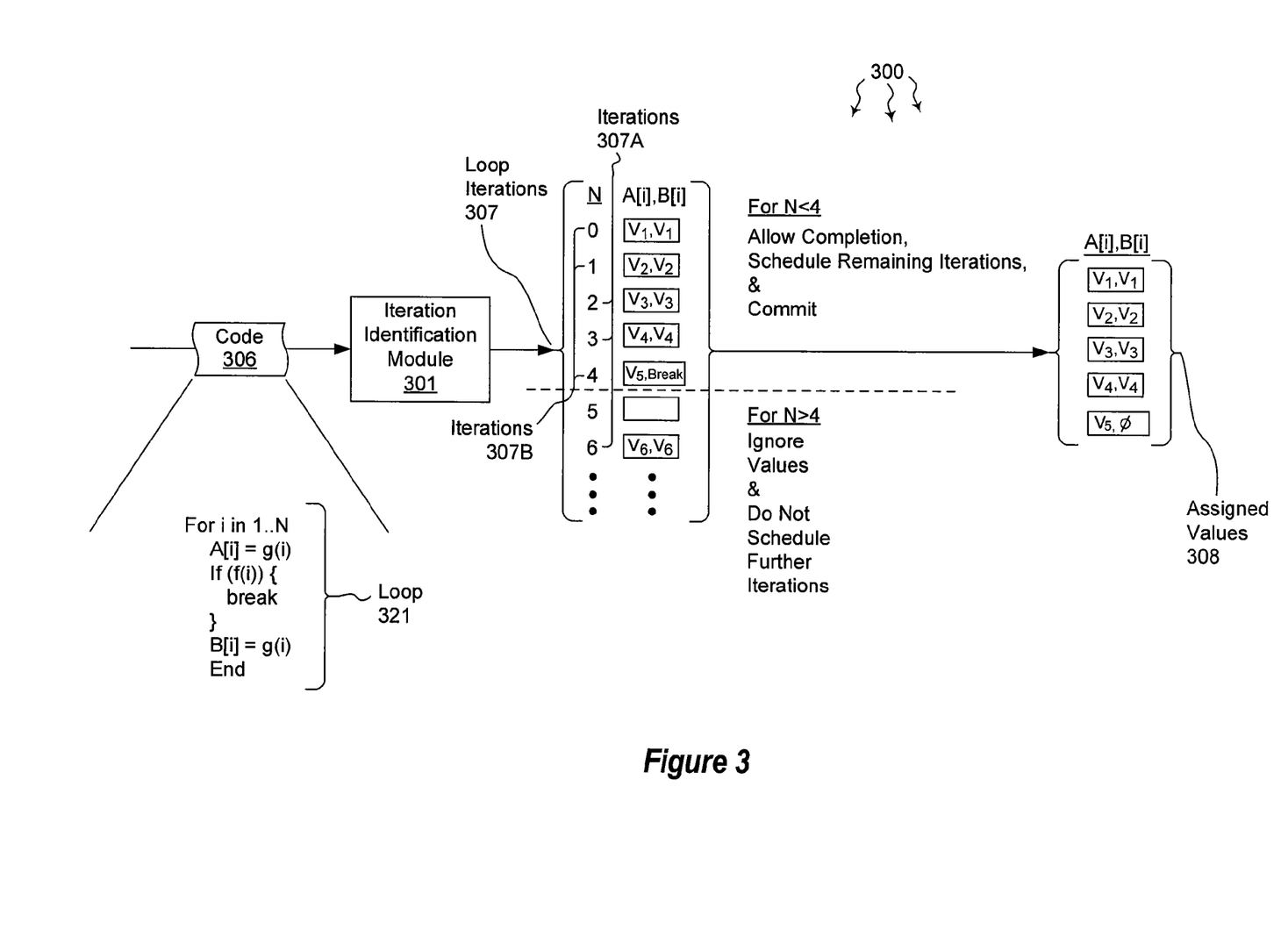
FIG. 3 illustrates another example computer architecture that facilitates implementing parallel loops with serial semantics.
Figure 4:
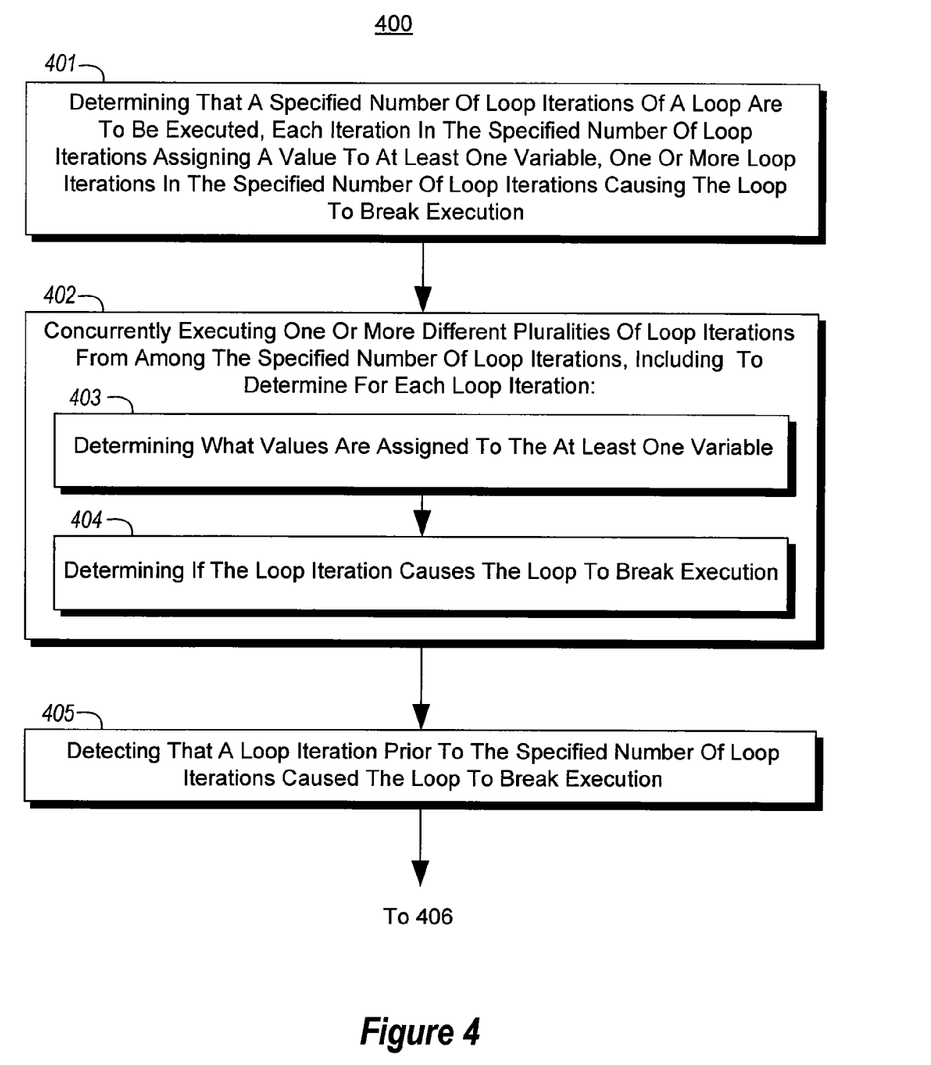
FIG. 4 illustrates a flow chart of another example method for implementing iterations of a serial loop in parallel.

FIG. 3 illustrates an example computer architecture 300 that facilitates implementing parallel loops with serial semantics. As depicted, computer architecture 300 includes iteration identification module 301 and code 306. FIG. 4 illustrates a flow chart of an example method 400 for implementing iterations of a serial loop in parallel. Method 400 will be described with respect to the components and data of computer architecture 300.

Method 400 includes an act of determining that a specified number of loop iterations of a loop are to be executed, each iteration in the specified number of loop iterations assigning a value to at least one variable, one or more loop iterations in the specified number of loop iterations causing the loop to break execution (act 401). For example, loop iteration module 301 can determine that loop iterations 307 of loop 321 are to be executed. Each iteration in loop iterations 307 assigns a value to array A and array B. Any loop iterations where f(i) is TRUE break execution of loop 321.

Method 400 includes an act of concurrently executing one or more different pluralities of loop iterations from among the specified number of loop iterations (act 402). For example, iterations 307 (N=2, 3, and 6) can be executed concurrently. Prior to or subsequently, iterations 307B can be (N=0, 1, and 4) can be executed concurrently.

For each loop iteration, method 400 includes an act of determining what values are assigned to the at least one variable (act 403) and an act of determining if the loop iteration causes the loop to break execution (act 404). For example, for each of loop iterations 307 it can be determined what values are assigned for A[i] and B[i] and if a loop iteration causes loop 321 to break.

Method 400 includes an act of detecting that a loop iteration prior to the specified number of loop iterations caused the loop to break execution (act 405). For example, it can be detected that the iteration for N=4 caused loop 321 to break. In response to the break in loop execution, method 400 includes an act of ignoring any assigned values for loop iterations that would otherwise occur after the loop iteration that caused the loop to break execution during serial execution (act 406). For example, assigned values for any iterations for N>4, including N=6, can be ignored. During serial execution these values would never be assigned since loop 321 would break prior to their assignment.

Method 400 includes an act of adjusting further concurrent execution of loop iterations to (a) execute loop iterations that would otherwise occur before the loop iteration that caused the loop to break execution during serial execution and (b) ignore any remaining loop iterations that would otherwise occur after the loop iteration that caused the loop to break execution during serial execution (act 407). Thus, further concurrent execution of loop iterations 307 can be adjusted to execute loop iterations for N<4 and ignore any remaining loop iterations for N>4. For example, if loop iterations 307B are concurrently executed prior to iterations 307A, iterations for N=2, 3 are executed and the iteration for N=6 is ignored. During serial execution, iterations N>4 would not be reached, since loop 321 would break prior to these iterations (i.e., loop 321 would break when N=4).

Method 400 includes an act of committing assigned values for loop iterations that would otherwise be assigned before the loop iteration that caused the loop to break execution during serial execution (act 408). For example, assigned values 308 can be committed for loop iterations 307. Assigned values 308 are values that would be assigned before loop 321 breaks during serial execution.

When appropriate, a reduction operator (e.g., merge) can be used on assigned values 308. However, instead of a value assigned in an iteration closest to N, a value assigned in an iteration closest to the break can be assigned to a variable (e.g., similar to assignment 109 in computer architecture 101).

Embodiments of the invention can be implemented in a distributed memory model, such as, for example, a cluster or Graphics Processing Unit ("GPU") where data is marshaled between a parallel loop body and outside the loop. Memory can be modeled on a shared-memory system.

In some embodiments, transformations are used to convert serial constructs to parallel constructs. Thus, although some code appears to have data dependencies requiring serial semantics, there are transformations that can be applied to the serial constructs to permit the constructs to be handled in parallel. It may be that semantically preserving pattern matching techniques are used.

For example, the following construct has a data dependency preventing parallelization since a and b are both read and written.

```
if (a>b)
    b = a
```

However, this construct can be transformed with a reduction operator $b = \max(b,a)$ //reduction and then use existing reduction techniques to parallelize.

Other optimizations can also be used. For example, the chattiness of data communication into and out of the loop body can be reduced. Side-effects which are not read after the loop do not necessarily need to be committed. Not committing side-effects can save on bandwidth of communicating data back from a loop body distributed across a cluster.

Further, if an execution engine supports asynchronous communication (such as GPUs or clusters), then a loop body can start execution before the incoming variables have been completely copied in. Additionally, if iteration never is to access a piece of data, it may be reasonable to not send the data to the execution engine owning that iteration.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, a method for implementing iterations of a serial loop in parallel by storing any variable assignments made during each iteration of the serial loop in a corresponding temporary copy and then merging the temporary copies, the method comprising:
    an act of determining that a specified number of loop iterations of a loop are to be executed, one or more iterations in the specified number of loop iterations assigning one of a plurality of different values to a variable used in the serial loop;
    an act of providing a temporary copy of the variable to each loop iteration;
    an act of concurrently executing one or more different pluralities of loop iterations from among the specified number of loop iterations to determine if a value and what value is assigned to the variable for each different loop iterations, including for at least one loop iteration:
        an act of assigning one of the plurality of different values to the temporary copy of the variable provided for the loop iteration; and
        an act of indicating that the temporary copy of the variable provided for the loop iteration was assigned a value;
    an act of ordering the temporary copies of the variable provided for the loop iterations based on when each loop iteration would have been executed serially during serial execution of the loop; and
    an act of merging the ordered temporary copies of the variable to the variable according to a reduction operation, the reduction operation including:
        analyzing the ordering of the temporary copies of the variable corresponding to the loop iterations;
        based on the analyzing, identifying the loop iteration closest to the last loop iteration that has assigned a value to its temporary copy of the variable; and
        in response to the identifying, assigning to the variable the value that the loop iteration closest to the last loop iteration assigned to its temporary copy of the variable.

2. The method as recited in claim 1, further comprising transforming at least one code construct within the loop so that loop iterations are parallelizable.

3. The method as recited in claim 1, wherein the act of providing a temporary copy of the variable to each loop iteration comprises an act of using an array to store a temporary copy of the variable for each loop iteration.

4. The method as recited in claim 3, wherein the act of using an array to store a temporary copy of the variable for each loop iteration comprises an act of modifying the loop to assign values for each iteration to a corresponding location within the array.

5. The method as recited in claim 1, wherein the act of concurrently executing one or more different pluralities of loop iterations comprises an act of executing one or more loop iterations in a different order relative to serial execution of the loop.

6. The method as recited in claim 1, wherein the act of indicating that that temporary copy of the variable provided for the loop iteration was assigned a value comprises an act of maintaining an extra bit flag for each temporary copy of the variable.

7. The method as recited in claim 1, wherein the act of indicating that the temporary copy of the variable provided for the loop iteration was assigned a value comprises an act of using sentinel 'uninitialized' values in the encoding for each temporary copy of the variable.

8. The method as recited in claim 1, wherein the act of merging the temporary copies of the variable according to a reduction operator comprises an act of using an associative merge operator.

9. At a computer system including one or more processors and system memory, a method for implementing iterations of a serial loop in parallel by storing any variable assignments made during each iteration of the serial loop in a corresponding temporary copy and then merging the temporary copies, the method comprising:
    an act of determining that a specified number of loop iterations of a loop are to be executed, each iteration in the specified number of loop iterations assigning a value to at least one variable, one or more loop iterations in the specified number of loop iterations causing the loop to break execution;
    an act of concurrently executing one or more different pluralities of loop iterations from among the specified number of loop iterations, including to determine for each loop iteration:
        an act of determining what values are assigned to the at least one variable; and
        an act of determining if the loop iteration causes the loop to break execution;
    an act of detecting that a loop iteration prior to the specified number of loop iterations caused the loop to break execution;
    in response to the break in loop execution:
        an act of ignoring any assigned values for loop iterations that would otherwise occur after the loop iteration that caused the loop to break execution during serial execution; and
        an act of adjusting further concurrent execution of loop iterations to:
            (a) execute loop iterations that would otherwise occur before the loop iteration that caused the loop to break execution during serial execution; and
            (b) ignore any remaining loop iterations that would otherwise occur after the loop iteration that caused the loop to break execution during serial execution;
    an act of committing assigned values for loop iterations that would otherwise occur before the loop iteration that caused the loop to break execution during serial execution;
    an act of ordering the assigned values based on when each loop iteration would have been executed serially during serial execution of the loop;

an act of merging the assigned values according to a reduction operator to identify the loop iteration closest to the loop iteration causing the break; and an act of assigning the assigned values for the loop iteration closest to the loop iteration causing the break as the values for the at least one variable.

10. The computer program product as recited in claim 1, wherein computer-executable instructions that, when executed, cause the computer system to merge the temporary copies of the variable according to a reduction operator comprise wherein computer-executable instructions that, when executed, cause the computer system to use an associative merge operator.

11. The method as recited in claim 10, further comprising transforming at least one code construct within the loop so that loop iterations are parallelizable.

12. The method as recited in claim 10, wherein the act of concurrently executing one or more different pluralities of loop iterations from among the specified number of loop iterations comprises an act of executing one or more loop iterations in a different order relative to serial execution of the loop.

13. The method as recited in claim 10, wherein the act of concurrently executing one or more different pluralities of loop iterations from among the specified number of loop iterations comprises an act of executing one or more different pluralities of loop iterations using a distributed memory model.

14. A computer program product for use at a computer system, the computer program product for implementing method for implementing iterations of a serial loop in parallel by storing any variable assignments made during each iteration of the serial loop in a corresponding temporary copy and then merging the temporary copies, the computer program product comprising one or more computer storage media having stored thereon computer-executable instructions that, when executed at a processor, cause the computer system to perform the method, including the following:

determine that a specified number of loop iterations of a loop are to be executed, one or more iterations in the specified number of loop iterations assigning one of a plurality of different values to a variable used in the serial loop;

provide a temporary copy of the variable to each loop iteration;

concurrently execute one or more different pluralities of loop iterations from among the specified number of loop iterations to determine if a value and what value is assigned to the variable for each different loop iterations, including for at least one loop iteration:

assigning one of the plurality of different values to the temporary copy of the variable provided for the loop iteration; and indicating that the temporary copy of the variable provided for the loop iteration was assigned a value;

order the temporary copies of the variable provided for the loop iterations based on when each loop iteration would have been executed serially during serial execution of the loop; and merge the ordered temporary copies of the variable to the variable according to a reduction operation, the reduction operation including:

analyzing the ordering of the temporary copies of the variable corresponding to the loop iterations;

based on the analyzing, identifying the loop iteration closest to the last loop iteration that has assigned a value to its temporary copy of the variable; and in response to the identifying, assigning to the variable the value that the loop iteration closest to the last loop iteration assigned to its temporary copy of the variable.

15. The computer program product as recited in claim 14, further comprising computer-executable instructions that, when executed, cause the computer system to transform at least one code construct within the loop so that loop iterations are parallelizable.

16. The computer program product as recited in claim 14, wherein computer-executable instructions that, when executed, cause the computer system to provide a temporary copy of the variable to each loop iteration comprise computer-executable instructions that, when executed, cause the computer system to use an array to store a temporary copy of the variable for each loop iteration.

17. The computer program product as recited in claim 16, wherein computer-executable instructions that, when executed, cause the computer system to use an array to store a temporary copy of the variable for each loop iteration comprise computer-executable instructions that, when executed, cause the computer system to modify the loop to assign values for each iteration to a corresponding location within the array.

18. The computer program product as recited in claim 14, wherein computer-executable instructions that, when executed, cause the computer system to indicate that the temporary copy of the variable provided for the loop iteration was assigned a value comprise computer-executable instructions that, when executed, cause the computer system to maintain an extra bit flag for each temporary copy of the variable.

19. The computer program product as recited in claim 14, wherein computer-executable instructions that, when executed, cause the computer system to indicate that the temporary copy of the variable provided for the loop iteration was assigned a value comprise computer-executable instructions that, when executed, cause the computer system to use sentinel 'uninitialized' values in the encoding for each temporary copy of the variable.

* * * * *

UNITED STATES PATENT AND TRADEMARK OFFICE
CERTIFICATE OF CORRECTION

PATENT NO. : 8,381,195 B2
APPLICATION NO. : 12/817466
DATED : February 19, 2013
INVENTOR(S) : Jonathon Michael Stall et al.

It is certified that error appears in the above-identified patent and that said Letters Patent is hereby corrected as shown below:

On the title page, in item (57), under "Abstract" column 2, line 8, delete "covert" and insert --convert--, therefor.

In the Specification

In column 5, line 43, delete "covert" and insert --convert--, therefor.

In the Claims

In column 10, line 10, in Claim 6, before "temporary" delete "that" and insert --the--, therefor.

Signed and Sealed this
Seventeenth Day of February, 2015

Michelle K. Lee
*Deputy Director of the United States Patent and Trademark Office*